United States Patent
El-Gammal et al.

(10) Patent No.: US 11,098,625 B2
(45) Date of Patent: Aug. 24, 2021

(54) MULTIPLE DEF INJECTION CONCEPT FOR REDUCING RISK OF SOLID DEPOSITS FORMATION IN DIESEL AFTERTREATMENT SYSTEMS

(71) Applicant: Robert Bosch GmbH, Stuttgart (DE)

(72) Inventors: Mohamed El-Gammal, Windsor (CA); Mark V. Casarella, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/635,751

(22) PCT Filed: Aug. 1, 2018

(86) PCT No.: PCT/IB2018/000987
§ 371 (c)(1),
(2) Date: Jan. 31, 2020

(87) PCT Pub. No.: WO2019/025860
PCT Pub. Date: Feb. 7, 2019

(65) Prior Publication Data
US 2020/0347767 A1 Nov. 5, 2020

Related U.S. Application Data

(60) Provisional application No. 62/540,208, filed on Aug. 2, 2017.

(51) Int. Cl.
*F01N 3/28* (2006.01)
*F01N 3/20* (2006.01)
(Continued)

(52) U.S. Cl.
CPC ......... *F01N 3/2066* (2013.01); *B01D 53/944* (2013.01); *B01D 53/9431* (2013.01);
(Continued)

(58) Field of Classification Search
CPC ...... F01N 3/2066; F01N 3/035; F01N 3/2892; F01N 2610/1453; B01D 53/9493; B01D 53/944
(Continued)

(56) References Cited

U.S. PATENT DOCUMENTS

| 5,976,475 A | 11/1999 | Peter-Hoblyn et al. |
| 7,028,680 B2 | 4/2006 | Liu et al. |

(Continued)

FOREIGN PATENT DOCUMENTS

| CN | 1198960 A | 11/1998 |
| CN | 104121075 A | 10/2014 |

(Continued)

OTHER PUBLICATIONS

Adelman et al., "Direct Injection into the Exhaust Stream of Gaseous Ammonia: Design and Efficiency of Injection and Mixing Hardware," SAE Technical Paper, 2015, 2015-01-1021.

(Continued)

*Primary Examiner* — Tom P Duong
(74) *Attorney, Agent, or Firm* — Michael Best & Friedrich LLP

(57) ABSTRACT

A compact SCR device is provided for use with a diesel exhaust fluid (DEF) injection system having multiple injectors for providing diesel exhaust fluid to exhaust gas to reduce $NO_x$ emissions. The DEF injectors are disposed in the close coupled SCR mixer. A first injector injects into a chamber of the mixer with sidewardly oriented impingement plates having openings. A second injector radially spaced and offset has a different angle from the first injector for injecting DEF into the SCR mixer. A swirl plate forces the exhaust gas in the flow path to turn and exit through an outlet opening. An inlet opening for the mixer is aligned transversely near the first injector and is offset from the outlet (Continued)

opening. Thus, upon entering the compact SCR mixer, the exhaust gas must change direction and passes by at least one injector and impingement plates having flaps and openings before exiting the mixer.

19 Claims, 11 Drawing Sheets

(51) Int. Cl.
  *B01D 53/94* (2006.01)
  *B01F 3/04* (2006.01)
  *B01F 5/00* (2006.01)
  *F01N 3/035* (2006.01)
  *F01N 3/10* (2006.01)

(52) U.S. Cl.
  CPC ...... *B01D 53/9463* (2013.01); *B01F 3/04049* (2013.01); *B01F 5/0065* (2013.01); *F01N 3/035* (2013.01); *F01N 3/103* (2013.01); *F01N 3/2892* (2013.01); *B01F 2005/0091* (2013.01); *F01N 2610/1453* (2013.01)

(58) Field of Classification Search
  USPC ................................................. 422/171, 176
  See application file for complete search history.

(56) References Cited

U.S. PATENT DOCUMENTS

| | | | |
|---|---|---|---|
| 7,032,578 B2 | 4/2006 | Liu et al. | |
| 7,140,357 B2 | 11/2006 | Wei et al. | |
| 7,552,722 B1 | 6/2009 | Shieh et al. | |
| 7,814,745 B2 | 10/2010 | Levin et al. | |
| 8,006,480 B2 | 8/2011 | McCarthy, Jr. et al. | |
| 8,109,077 B2 | 2/2012 | Reba et al. | |
| 8,418,443 B2 | 4/2013 | Millet et al. | |
| 8,491,842 B2 | 7/2013 | Johansen et al. | |
| 8,881,712 B2 | 11/2014 | De Almeida et al. | |
| 8,935,918 B2 | 1/2015 | Vosz | |
| 9,192,892 B2 | 11/2015 | Nunez et al. | |
| 9,334,778 B2 | 5/2016 | Henry et al. | |
| 9,375,682 B2 | 6/2016 | Maus et al. | |
| 2009/0173063 A1 | 7/2009 | Boorse et al. | |
| 2013/0031891 A1 | 2/2013 | Ponnathpur | |
| 2014/0166141 A1 | 6/2014 | Golin et al. | |
| 2014/0318112 A1 | 10/2014 | Solbrig et al. | |
| 2014/0360168 A1 | 12/2014 | Broderick et al. | |
| 2015/0013309 A1 | 1/2015 | Upadhyay et al. | |
| 2015/0059317 A1 | 3/2015 | Mital et al. | |
| 2015/0240689 A1 | 8/2015 | Guilbaud et al. | |
| 2015/0285192 A1 | 10/2015 | Roth et al. | |
| 2015/0345356 A1* | 12/2015 | Yl .......................... B01F 5/0473 366/173.2 |
| 2016/0090887 A1 | 3/2016 | Mitchell et al. | |
| 2016/0138454 A1* | 5/2016 | Alano ................... B01F 5/0614 422/168 |
| 2016/0158714 A1 | 6/2016 | Li et al. | |
| 2016/0160725 A1 | 6/2016 | Hudgens et al. | |
| 2016/0356200 A1 | 12/2016 | Bressler et al. | |
| 2017/0051654 A1 | 2/2017 | Gupta et al. | |
| 2017/0130628 A1 | 5/2017 | Franz et al. | |

FOREIGN PATENT DOCUMENTS

| | | | |
|---|---|---|---|
| CN | 106030063 A | 10/2016 | |
| CN | 106237913 A | 12/2016 | |
| DE | 102011077156 B4 | 12/2012 | |
| DE | 102013223313 A1 | 5/2015 | |
| EP | 2955351 A1 | 12/2015 | |
| JP | 2015110929 A | 6/2015 | |
| WO | 2014051605 A1 | 4/2014 | |
| WO | 2014051617 A1 | 4/2014 | |
| WO | 2015071233 A1 | 5/2015 | |
| WO | 2018001789 A1 | 6/2017 | |

OTHER PUBLICATIONS

Bari et al., "Optimized Number of Intake Runner Guide Vanes to Improve In-Cylinder Airflow Characteristics of CI Engine Fuelled by Higher Viscous Fuels," SAE 2014 World Congress & Exhibition, 2014, 2014-01-0661.

Bora et al., "Investigation on the flow behavior of a venturi type gas mixer designed for dual fuel diesel engines," Int. J. of Emerging Tech. and Adv. Eng., 2013, 3(3):202-209.

Bosch, "Invention Report No. 2016/0398," published May 2016 (4 pages).

Smith et al., "Evaluation and Prediction of Deposit Severity in SCR Systems," SAE International J. Engines, 2016, 9(3):1735-1750.

International Search Report and Written Opinion for Application No. PCT/IB2018/000987 dated Nov. 6, 2018 (15 pages).

Translation of National Intellectual Property Administration, P.R. China Search Report for Application No. 201880064234.9 dated Apr. 22, 2021 (4 pages).

* cited by examiner

MULTIPLE DEF INJECTION CONCEPT FOR REDUCING RISK OF SOLID DEPOSITS FORMATION IN DIESEL AFTERTREATMENT SYSTEMS

RELATED APPLICATIONS

This application claims priority from U.S. Provisional application 62/540,208, filed Aug. 2, 2017, the disclosure of which is hereby incorporated by reference in its entirety.

BACKGROUND

The present arrangement relates to a method and system for reducing risk of solid deposits forming in a diesel after-treatment system that includes multiple diesel exhaust fluid injectors for a selective catalytic reduction (SCR) mixer.

SUMMARY

A selective catalytic converter is widely used as an effective method in reducing diesel $NO_x$ emissions by performing selective catalytic reduction (SCR). In order to meet future low nitrogen oxide(s) ($NO_x$) emission requirements such as super ultra-low emissions vehicle (SULEV) 30 for passenger vehicles & CARB low 0.02 NOx for heavy duty and off-highway applications, high diesel exhaust fluid (DEF) fluid injection rates will be required. High urea dosing rates will increase the level of DEF fluid liquid film wall thicknesses, which in consequence might lead to increasing the risk of solid deposit byproduct formation. The risk of solid deposits formation is even higher during engine cold starts and/or low load operating conditions. Solid deposits in selective catalytic reduction (SCR) devices significantly hamper the SCR mixer functionality. Deposits may also increase the SCR back pressure, DEF fluid consumption and reduce the ammonia distribution at an entrance to a SCR.

High dosing rates in SCR devices might be required to meet future low $NO_x$ emission requirements, and especially low emission vehicle (LEV) III $NO_x$ emission requirements. At low temperature operating points, i.e., exhaust temperatures between 180~250° C., due to the lack of DEF liquid film evaporation rates there is a high chance that biuret and other undesirable solid byproducts can be formed. These byproducts can be formed along SCR mixer flaps, mixer walls and/or along the SCR catalyst inlet cone. The solid deposit build-up can adversely increase back pressure and/or reduce the delivered ammonia amount or uniformity at a SCR catalyst inlet, thus hampering the SCR system functionality One embodiment is directed to a compact SCR device for injecting diesel exhaust fluid (DEF) that comprises a diesel oxidation catalyst (DOC), a selective catalytic converter (SCR), and a SCR mixer. The SCR mixer includes a generally cylindrical outer wall defining a chamber, at least one inlet opening in a top plate disposed on a top/upstream side of the outer wall to receive an exhaust gas flow, an outlet opening in a bottom plate disposed on a bottom/downstream side of the outer wall, and a swirl plate disposed in the chamber and oriented about a portion of the outlet opening, wherein the swirl plate being oriented in a similar direction as the outer wall. The SCR mixer also includes a first injector flange oriented for injecting DEF into the chamber and a second injector flange oriented for injecting DEF into the chamber. The DOC is in series with the SCR mixer and the SCR.

Another embodiment is directed to a compact SCR device for injecting diesel exhaust fluid (DEF) comprising: a diesel oxidation catalyst (DOC), a selective catalytic converter (SCR), and a SCR mixer, wherein the DOC is in series with the SCR mixer and the SCR. The SCR mixer includes a generally cylindrical outer wall defining a chamber, at least one inlet opening in a top plate disposed on a top/upstream side of the outer wall to receive an exhaust gas flow, and an outlet opening in a bottom plate disposed on a bottom/downstream side of the outer wall, The SCR mixer also includes a swirl plate disposed in the chamber and oriented about a portion of the outlet opening, a first injector flange disposed near the inlet opening and oriented for injecting DEF into the chamber, a second injector flange disposed downstream from the first injector flange and oriented for injecting DEF into the chamber, and an impingement plate disposed in the chamber downstream from the first injector flange.

In another embodiments, a SCR mixer includes an outer wall defining a chamber, at least one inlet opening in a top plate disposed on a top/upstream side of the outer wall to receive an exhaust gas flow, an outlet opening in a bottom plate disposed on a bottom/downstream side of the outer wall, and a swirl plate disposed in the chamber and oriented about a portion of the outlet opening. The SCR mixer also includes a first injector flange disposed in the outer wall and oriented for injecting DEF into the chamber, a second injector flange disposed in the outer wall and oriented for injecting DEF into the chamber downstream from the first injector flange, and a shielding plate secured to the second injector flange, the shielding plate projecting into the chamber.

One embodiment provides a mixer having an input aperture and an output aperture spaced or offset from each other, combined with injectors disposed at axial locations and radially and otherwise spaced from each other. Additional structure includes a swirl wall provided about portions of the exit aperture.

Other aspects of the invention will become apparent by consideration of the detailed description and accompanying drawings.

DETAILED DESCRIPTION

Before any embodiments are explained in detail, it is to be understood that the embodiments are not limited in their application to the details of construction and the arrangement of components set forth in the following description or illustrated in the following drawings. The invention is capable of other embodiments and of being practiced or of being carried out in various ways.

The disclosed embodiments consider a multi injection system for spraying DEF fluid in diesel exhaust stream rather than utilizing the traditional way of using a single injector only. The main hypothesis is that by distributing the urea dosing amount required for $NO_x$ conversion between two or multi injectors installed at two or multiple different locations of injector flanges inside SCR mixing sections, the liquid film thickness applied will be significantly reduced and the wall wetting area will be increased. This approach provides better heat transfer between exhaust gas and DEF liquid film, thus resulting in higher film evaporation rates, and reducing the risk of solid deposit formation.

Figure 1:
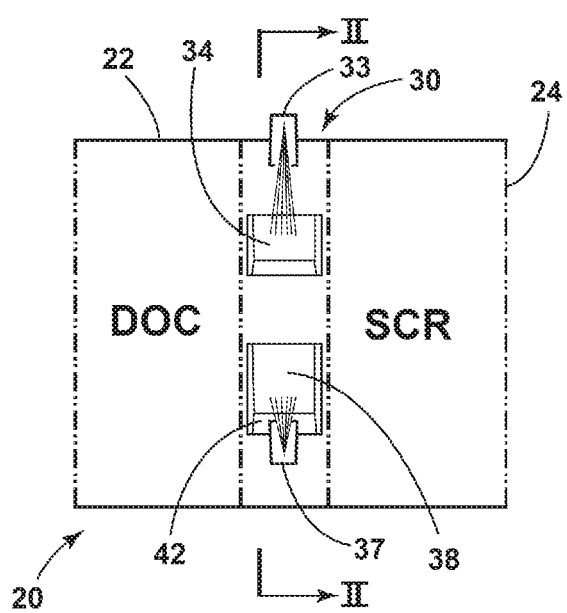
FIG. 1 is a diagram of a compact SCR device showing interior of a SCR mixer.

FIG. 1 shows a compact SCR device 20 for injecting diesel exhaust fluid (DEF) comprising a diesel oxidation catalyst (DOC) 22, a selective catalytic converter (SCR) 24, and a compact SCR mixer 30. The SCR mixer 30 is disposed between the DOC 22 and the SCR 24 to form the compact SCR device 20.

Figure 2:
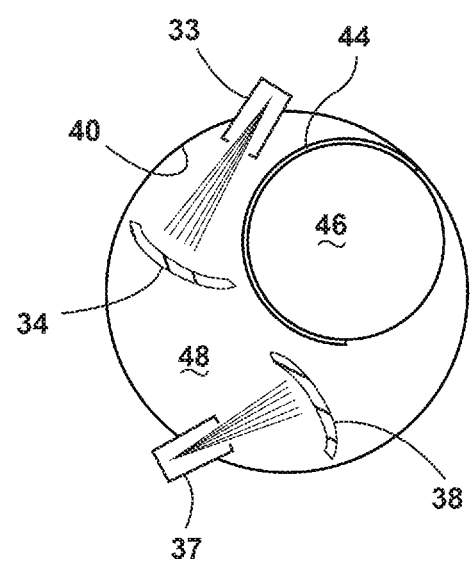
FIG. 2 is a cross sectional view of an SCR mixer of the SCR device taken at II-II in FIG. 1.

The compact SCR mixer 30 shown in FIGS. 1 and 2 includes a first injector 33, a first impingement plate 34, a second injector 37, and a second impingement plate 38. The SCR mixer 30 is defined by a generally cylindrical outer wall 40 defining a chamber 42 and a swirl plate 44 disposed in the chamber and oriented about a portion of an outlet opening 46. The outlet opening 46 is formed in a bottom plate 48 on a bottom/downstream side of the outer wall 40 and provides the exhaust gas flow to the SCR 24. Further, the SCR mixer 30 includes an inlet opening in a top plate (not shown) disposed on a top/upstream side of the outer wall 40 to receive exhaust gas flow from the DOC 22. Thus, the DOC 22 is in series with the SCR mixer 30 and the SCR 24. In FIG. 2, the impingement plates 34, 38 are oriented to directly receive much of the DEF from the injectors 33, 37 provided in respective injector flanges.

In one embodiment, the selective catalytic converter (SCR) 24 is combined with a diesel particulate filter (DPF) to form the SCR 24 including a filter.

Figure 3:
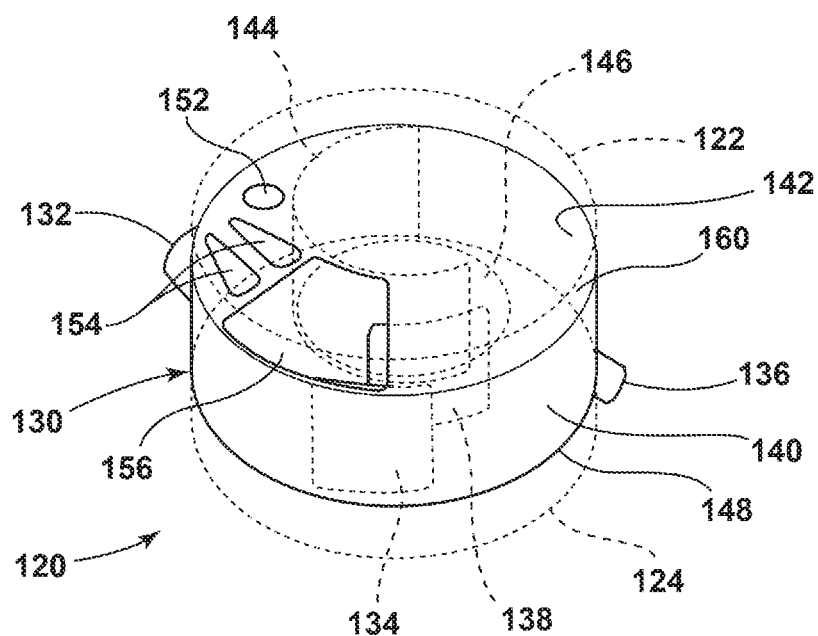
FIG. 3 is a perspective view of another embodiment of an SCR device wherein broken lines are used to show interior elements.

FIG. 3 shows a perspective view with broken lines to show interior elements of a compact SCR device 120 for injecting diesel exhaust fluid (DEF) comprising a diesel oxidation catalyst (DOC) 122, a selective catalytic converter (SCR) 124, and a compact SCR mixer 130. The SCR mixer 130 is disposed between the DOC 122 and the SCR 124 to form the compact SCR device 120.

Figure 4:
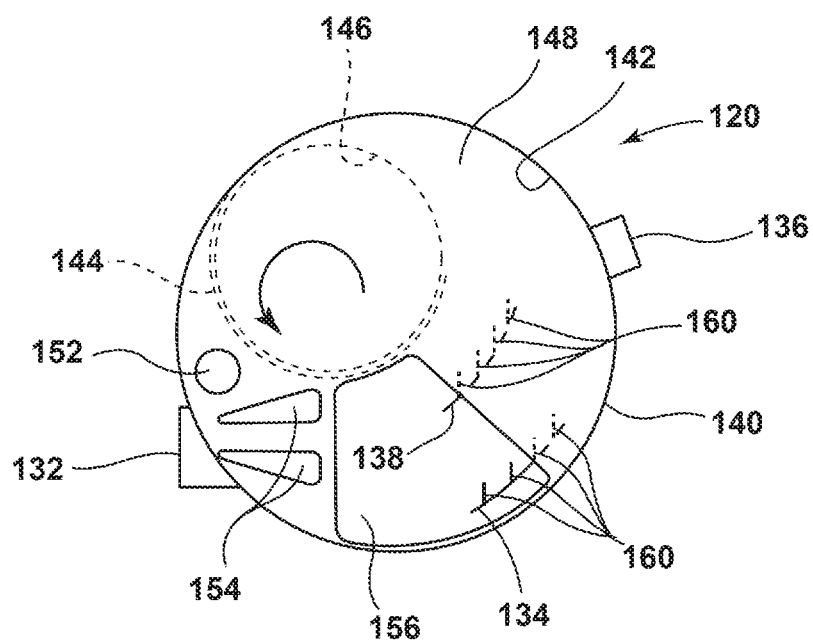
FIG. 4 is a top view of FIG. 3 which shows interior elements.

The compact SCR mixer 130 shown in FIG. 3 and FIG. 4 includes a first injector flange 132, a first impingement plate 134, a second injector flange 136, and a second impingement plate 138. The arrangement differs significantly from the FIG. 1 embodiment, as the second injector flange 136 supports an injector that is not directed to either impingement plate 134, 138. The impingement plates 134, 138 are oriented sidewardly with respect to a direction of diesel exhaust passing through the SCR mixer 130 and with respect to the first injector flange 132. The SCR mixer 130 is defined by a generally cylindrical outer wall 140 defining an evaporation chamber 142 and a swirl plate 144 disposed in the chamber and oriented about a portion of an outlet opening 146. The outlet opening 146 is formed in a bottom plate 148 on a bottom/downstream side of the outer wall 140 and provides the exhaust gas flow to the SCR 124.

The compact SCR mixer 130 shown in FIG. 3 and FIG. 4 includes a plurality of inlet openings in a top plate disposed on a top/upstream side of the outer wall 40 to receive exhaust gas flow from the DOC 122. The inlet openings include a generally oval inlet opening 152, a pair of cone shaped inlet openings 154 and a large trapezoidal shaped inlet opening 156 shown in the top view of FIG. 4. The trapezoidal shaped inlet opening 156 extends from a nearby portion of the outer wall 140 to near a portion of the swirl plate 144. The first and second impingement plates 134, 138 both include a plurality of impact elements 160, such as flaps that project inwardly or outwardly from the respective impingement plates 134, 138. The flaps or impact elements 160 are partially cut out from the body of the respective impingement plates 134, 138. In one embodiment, the impact elements 160 are folded inwardly toward the swirl plate 144. The inlet openings 152, 154, 156 and the outlet opening 146 are offset as shown in FIG. 4. Other arrangements are contemplated.

Figure 5:
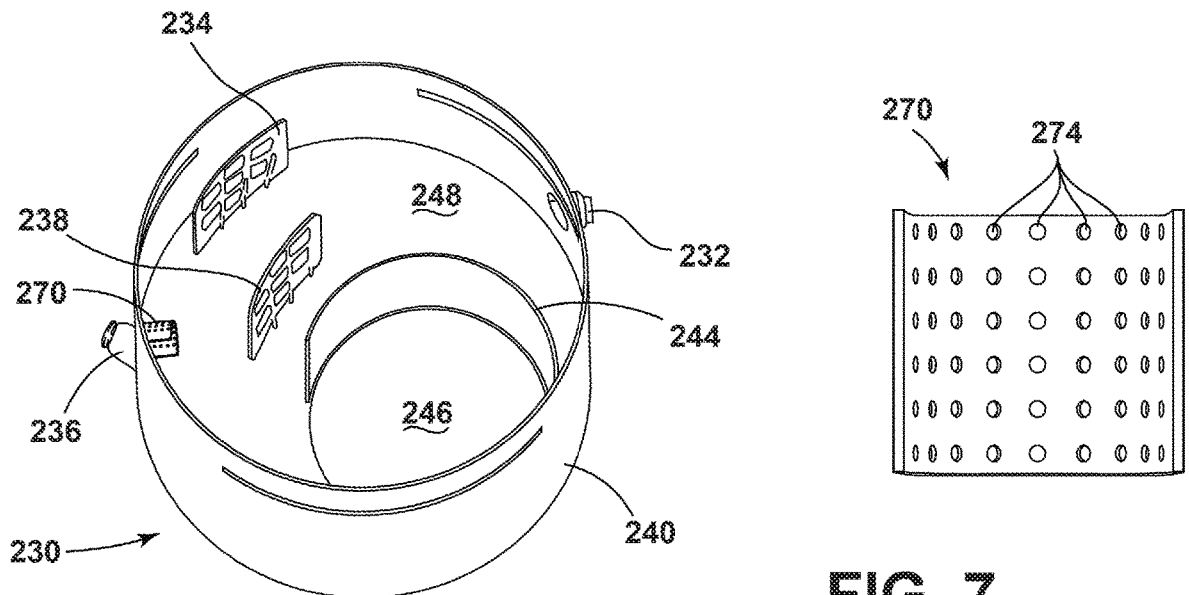
FIG. 5 is a different perspective view of a similar embodiment of a SCR mixer as in FIG. 3 with a top plate removed.

FIG. 5 shows another perspective view of a compact SCR mixer 230 with the top plate removed that is similar to the embodiment shown in FIGS. 3 and 4. The compact SCR mixer 230 includes a first injector flange 232 and a spaced second injector flange 236. The compact SCR mixer 230 includes a first impingement plate 234 and a second impingement plate 238. The SCR mixer 230 includes a cylindrical outer wall 240 surrounding a bottom plate 248. Further, a swirl plate 244 within a chamber formed by the outer wall is disposed along a portion of the perimeter of an outlet opening 246 formed in the bottom plate 248. The outlet opening 246 provides an exit path for diesel exhaust passing through the SCR mixer 230.

Figure 7:
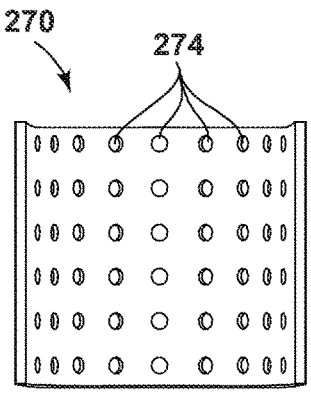
FIG. 7 is a side view of the shielding plate shown in FIG. 6.
Figure 6:
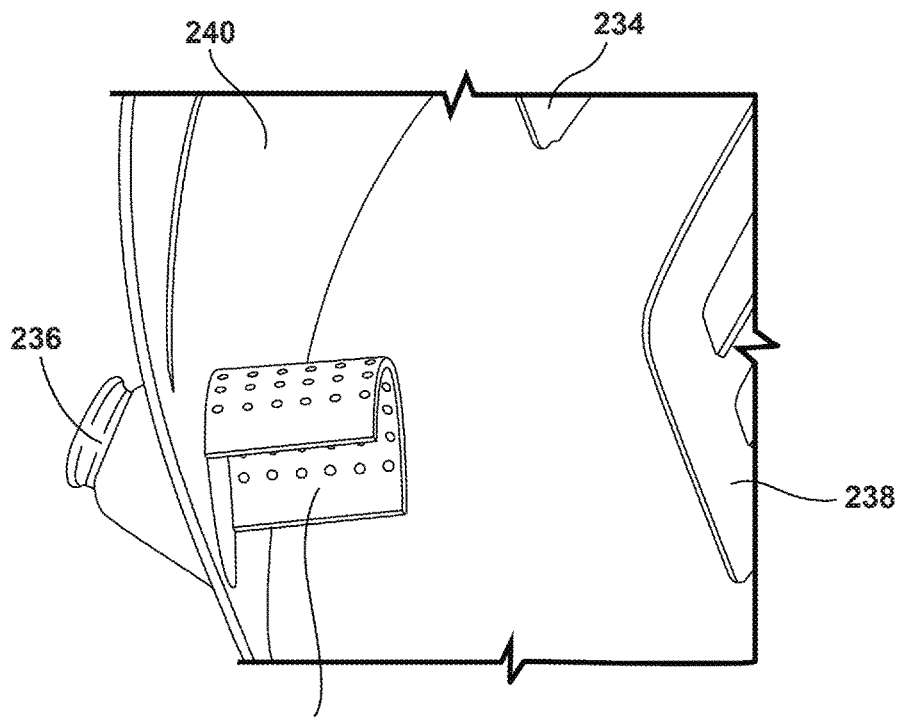
FIG. 6 is a close up of the shielding plate and a portion of other elements shown in FIG. 5.

FIG. 5 also shows a shielding plate 270 secured to the second injector flange 236. The close-up of FIG. 6 shows the shielding plate 270 having a curved shape that encloses about three sides of an injection path for DEF provided by a DEF injector through the second injector flange 236. FIG. 7 shows rows of a plurality of open bore apertures 274 provided over essentially the entire surface of the shielding plate 270, except near the opposing ends as shown in FIG. 6. The shielding plate 270 is disposed to minimize the effect of exhaust gas flow upon DEF injected into the chamber of the compact SCR mixer 230 via the second injector flange 236. The shielding plate 270 minimizes the swirling diesel exhaust caused in part by the swirl plate 244 that effects injected DEF provided via the second injector flange 236.

Figure 8:
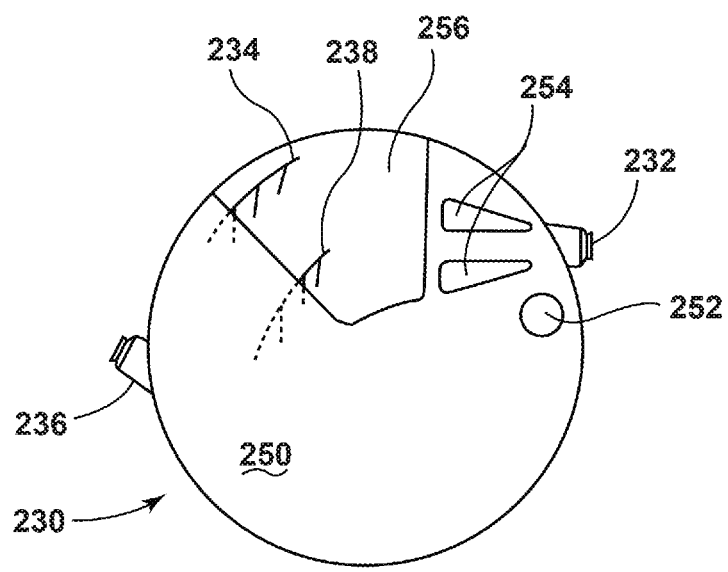
FIG. 8 is a top view of the SCR mixer shown in FIG. 5.

FIG. 8 shows a top view of the compact SCR mixer 230 of FIG. 5, showing a top plate 250. The top plate 250 includes a generally oval inlet opening 252, a pair of cone shaped inlet openings 254 and a large trapezoidal shaped inlet opening 256.

Figure 9:
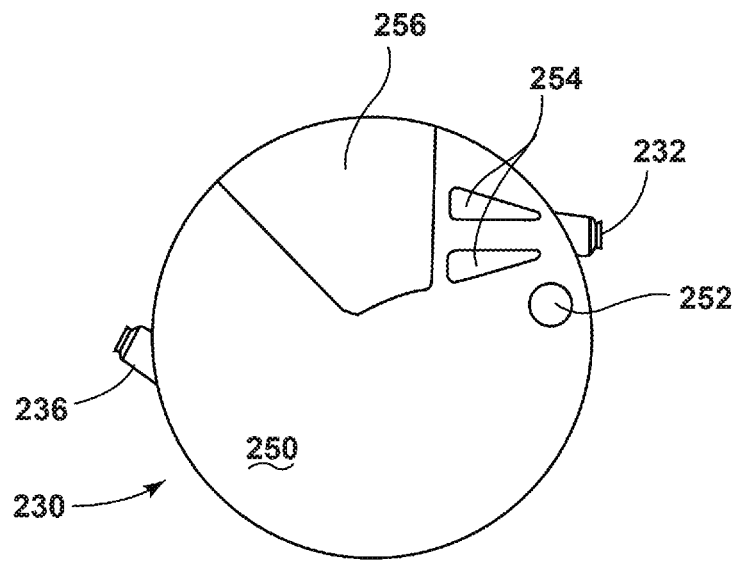
FIG. 9 is a top view of another embodiment of a SCR mixer.
Figure 10:
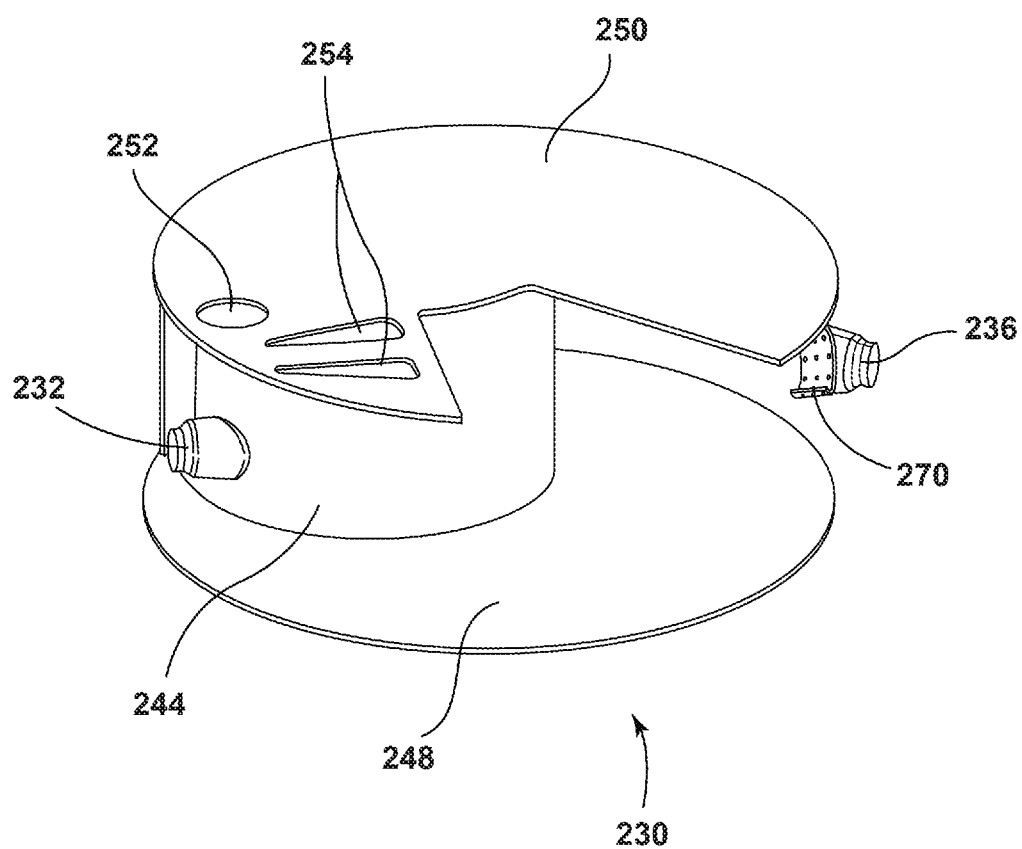
FIG. 10 is a perspective view of the SCR mixer of FIG. 9 with the outer wall removed.

FIG. 9 shows a top view of another compact SCR mixer 230 similar to the embodiment of FIGS. 5-8, except for removal of the impingement plates 234, 238, which thus are not illustrated in FIG. 9. The embodiment shown in FIG. 9 has the same structure as shown in FIGS. 5-8, except for being free from impingement plates. FIG. 10 shows the compact SCR mixer 230 of FIG. 9 with the outer wall removed. The bottom plate 248 does not support impingement plates and the DEF is injected into the exhaust gas flow. This causes the DEF to evaporate naturally while traveling in exhaust stream, and thus reduces spray/wall impingement and increases mixer robustness against formation of solid deposits.

Figure 11:
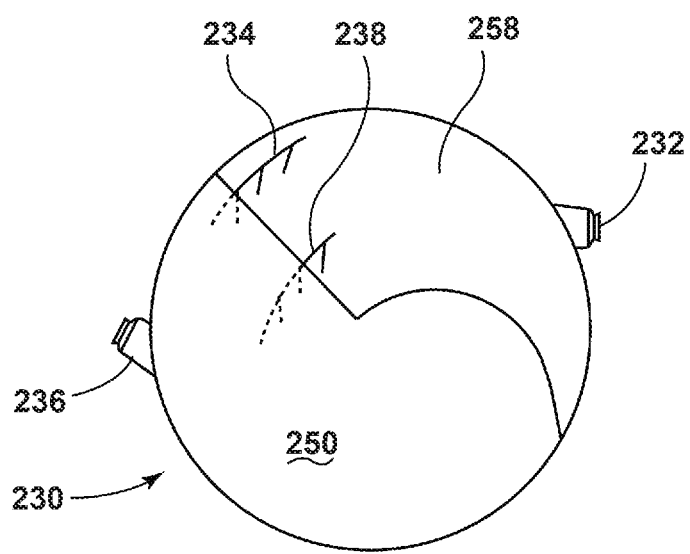
FIG. 11 is a top view of another embodiment of the SCR mixer.
Figure 12:
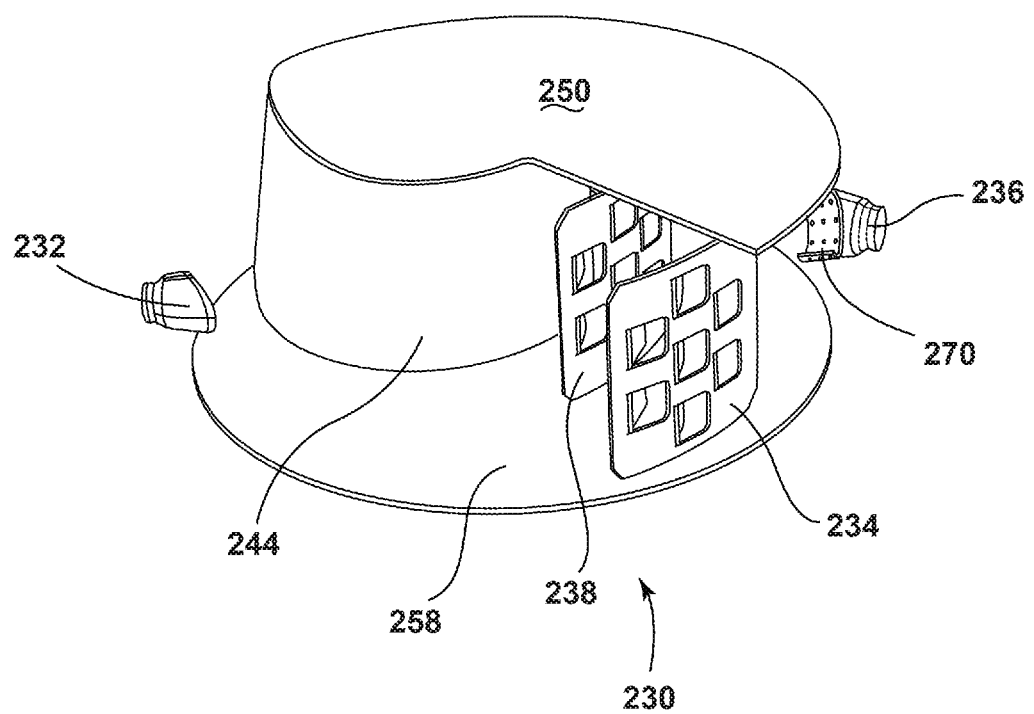
FIG. 12 is a perspective view of the SCR mixer of FIG. 11 with the outer wall removed.

FIG. 11 is a top view of another compact SCR mixer 230 similar to the embodiment of FIGS. 5-8, except for the top plate 250. The top plate 250 includes a single large opening 258 that extends beyond the injector flange 232. The opening 258 extends from the outer wall 240 essentially to a top edge of the swirl plate 244. A top edge of the swirl plate 244 typically is essentially in contact with an edge of the top plate 250 so that diesel exhaust entering the compact SCR mixer 230 must follow a path past the impingement plates 234, 238 to exit via the outlet opening 246. FIG. 12 shows the compact SCR mixer 230 of FIG. 11 with the outer wall removed. Thus, the injector flange 232 applies DEF toward the impingement plates 234, 238. The injector flange 236 includes a shielding plate 270. The first injector flange 232 is free from a shielding plate.

Figure 13:
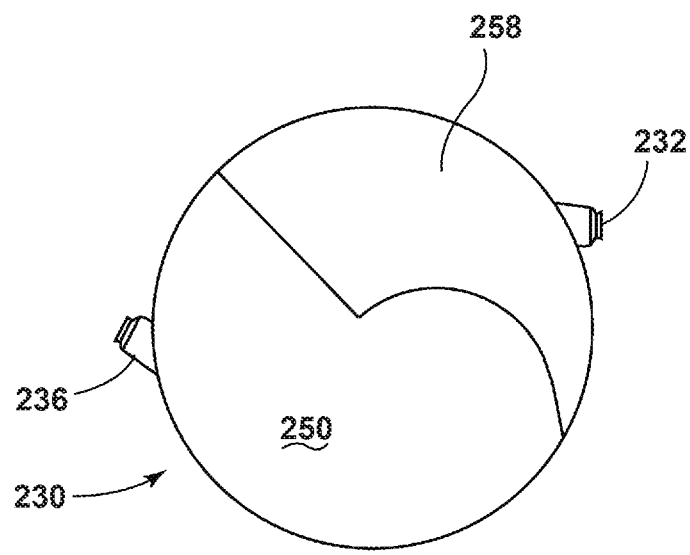
FIG. 13 is a top view of another embodiment of the SCR mixer.
Figure 14:
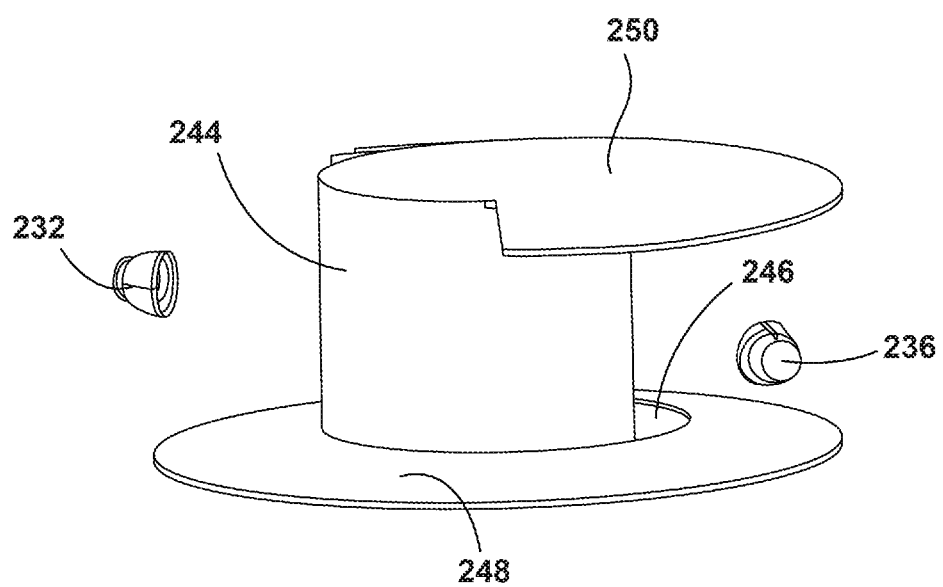
FIG. 14 is a side view of the SCR mixer of FIG. 13 with the outer wall removed.

FIG. 13 shows another embodiment similar to the compact SCR mixer 230 shown in FIGS. 5-8. The differences are as follows. The embodiment shown in FIG. 13 includes the top plate 250 having an opening 258 as shown in the embodiment of FIG. 11. Further, the impingement plates are removed in this embodiment as in FIG. 10. FIG. 14 shows a perspective view of FIG. 13 with the outer wall removed. The compact SCR mixer 230 includes injector flanges 232, 236. The compact SCR mixer 230 includes a swirl plate 244, a bottom plate 248 and the top plate 250. A portion of the outlet opening 246 is also shown in FIG. 14. Thus, the compact SCR mixer 230 shown in FIGS. 13 and 14 includes single inlet opening. However, providing at least one inlet opening is disclosed for other embodiments.

Operation

Figure 15:
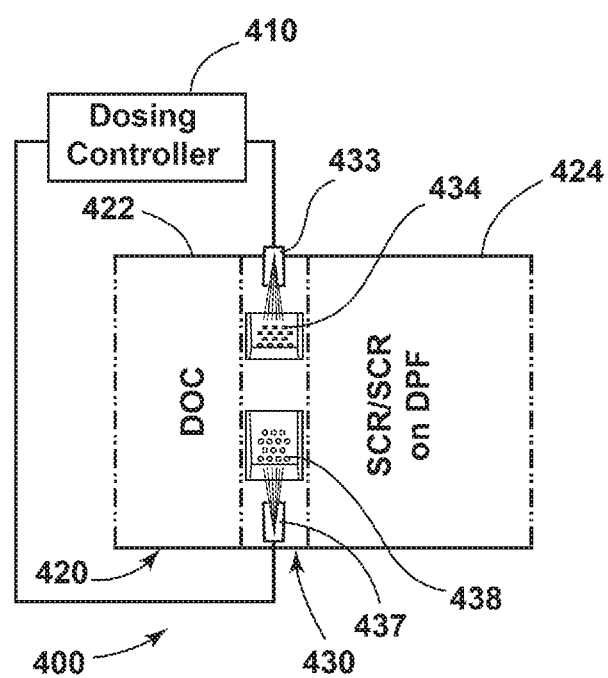
FIG. 15 is a diagram of a SCR system including a controller and a SCR device.

As shown in the diagram of FIG. 15, the SCR system 400 includes a dosing controller 410 and a SCR device 420. The SCR device 420 includes a DOC 422, a SCR 424 and a compact SCR mixer 430 disposed there between. The mixer 430 includes first and second injectors 433, 437 provided at respective injector flanges for delivering DEF fluid to impingement plates 434, 438 disposed therein. The DEF is injected into the exhaust gas flow for the purpose of reducing $NO_x$ and reducing the risk of solid deposit formation. By distributing the DEF fluid required for $NO_x$ conversion between the injectors 433, 437, the liquid film thickness and the spray surface load along the mixing section wall and flaps of the impingement plates 434, 438 will be reduced and thus substantially reduce the chance of solid deposit formation. The greater surface area with DEF applied thereto will promote increased evaporation of the DEF. The SCR 424 then assists in the removal of $NO_x$. In one embodiment, the SCR 424 is combined with a DPF.

The dosing controller 410 controls valves of the injectors 433, 437 to inject DEF into the compact SCR mixer 430 that is provided from a DEF storage tank. In one embodiment, the dosing controller 410 is incorporated into an electronic control unit (ECU) of a vehicle having an internal combustion engine. In another embodiment, the ECU is separate from and in communication over a communication bus with the dosing controller 410. In another embodiment, the dosing controller 410 includes an electronic processor and a memory. The injectors dosing rate is controlled via the dosing controller 410. The dosing rates at any engine operating point might be equal between the two injectors or might be higher at one injector compared to the other or might be alternating at different rates between the injectors for increasing mixer deposit robustness against solid deposit formation.

The electronic processor (e.g., a microprocessor, application specific integrated circuit, etc.) is coupled to the memory to execute control of the injectors 433, 437.

The injectors 433, 437 shown in FIG. 15 and the other embodiments, each provide DEF for reducing $NO_x$ emissions with the compact SCR device 420. The injectors can be similar, resulting in the development of similar sprays, or different, resulting in different spray patterns (i.e., different spray droplet size distributions, spray cone angles, No. of spray cones, etc.). The multi DEF injection concept can be used in conjunction with SCR mixer flaps or without. In case of utilizing impingement plates, the impingement plates can be identical for each of the injectors or can have different geometries. In one embodiment, the injector flanges are oriented at an angle inwardly into the chamber 42 and radially spaced from each other. In another embodiment, the injector flanges are radially offset from each other.

Figure 16:
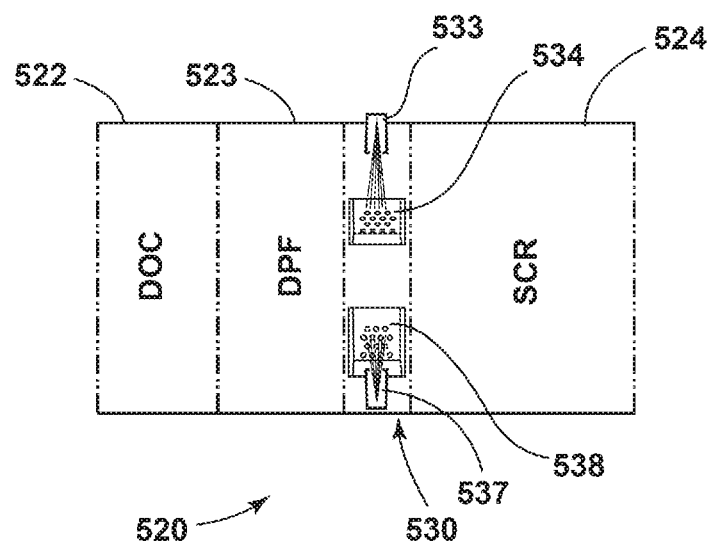
FIG. 16 is a diagram of a compact SCR device showing interior of a SCR mixer.

FIG. 16 shows another embodiment of a compact SCR device 520 for injecting diesel exhaust fluid (DEF) comprising a diesel oxidation catalyst (DOC) 522, a diesel particulate filter (DPF) 523, a selective catalytic converter (SCR) 524, and a compact SCR mixer 530. The SCR mixer 530 is disposed between the DPF 523 and the SCR 524 to form the compact SCR device 520. The compact SCR mixer 530 includes a first injector 533, a first impingement plate 534, a second injector 537, and a second impingement plate 538.

Figure 17:
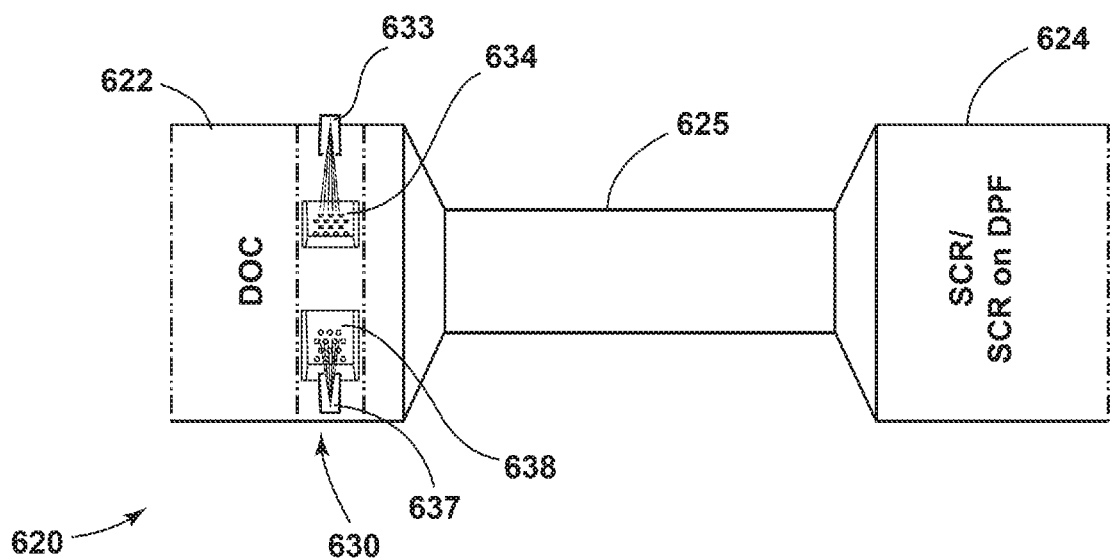
FIG. 17 is a diagram of a SCR device showing interior of a SCR mixer.

FIG. 17 shows another embodiment of a SCR device 620 for injecting diesel exhaust fluid (DEF) comprising a diesel oxidation catalyst (DOC) 622, a compact SCR mixer 630, a pipe connector 625, and a selective catalytic converter (SCR) 624. The compact SCR mixer 630 is disposed between the DOC 623 and the SCR 624 to form the SCR device 620. The compact SCR mixer 630 includes a first injector 633, a first impingement plate 634, a second injector 637, and a second impingement plate 638. The SCR 624 includes a DPF in another embodiment.

Figure 18:
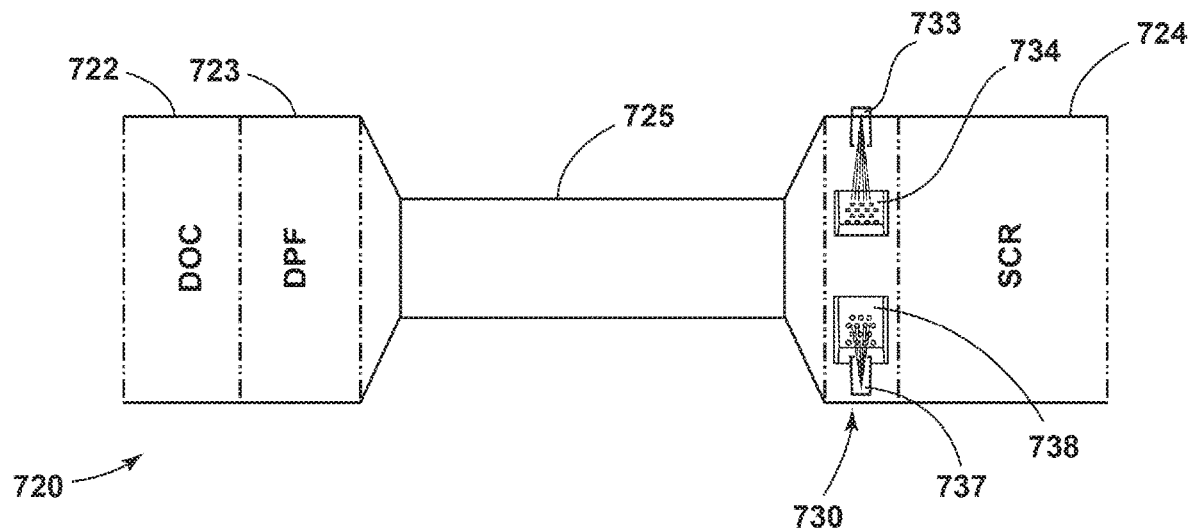
FIG. 18 is a diagram of a SCR device showing interior of a SCR mixer.

FIG. 18 shows another embodiment of a SCR device 720 for injecting diesel exhaust fluid (DEF) comprising a diesel oxidation catalyst (DOC) 722, a diesel particulate filter (DPF) 723, a pipe connector 725, a compact SCR mixer 730, and a selective catalytic converter (SCR) 724. The compact SCR mixer 730 is disposed between the pipe connector 725 and the SCR 724 to form the SCR device 720. The compact SCR mixer 730 includes a first injector 733, a first impingement plate 734, a second injector 737, and a second impingement plate 738.

Figure 19:
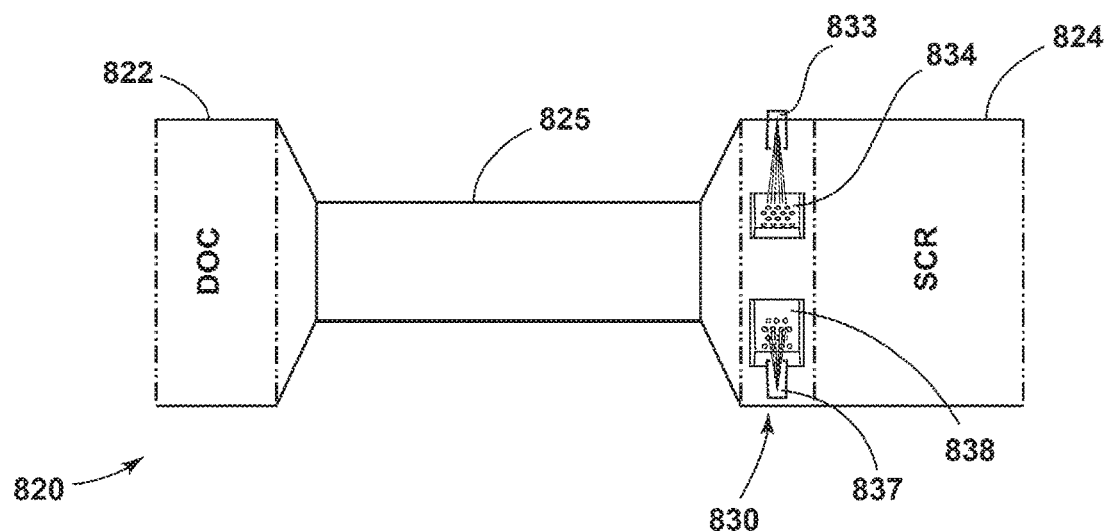
FIG. 19 is a diagram of a SCR device showing interior of a SCR mixer.

FIG. 19 shows another embodiment of a SCR device 820 for injecting diesel exhaust fluid (DEF) comprising a diesel oxidation catalyst (DOC) 822, a pipe connector 825, a compact SCR mixer 830, and a selective catalytic converter (SCR) 824. The compact SCR mixer 830 is disposed between the pipe connector 825 and the SCR 824 to form the SCR device 820. The compact SCR mixer 830 includes a first injector 833, a first impingement plate 834, a second injector 837, and a second impingement plate 838. The SCR 824 includes a DPF in another embodiment. The embodiments of FIGS. 16-19 operate in a similar manner as the embodiments discussed above.

The FIG. 1 embodiment is directed to a diesel exhaust fluid (DEF) injection system having multiple injectors 33, 37 for providing diesel exhaust fluid to an exhaust to reduce diesel $NO_x$ emissions. The DEF injectors 33, 37 are arranged essentially radially in a close coupled compact SCR mixer 30 as shown in FIGS. 1 and 2. As shown in the embodiment of FIG. 14, the injector flanges 232, 236 are provided radially spaced and radially offset from each other. Thus, injectors provide DEF having a different pattern that covers a different area in FIG. 14.

The impingement plates 34, 38 shown in FIG. 1 are curved elongate elements that assist in forcing the exhaust in the flow path to exit through an outlet opening. The inlet opening (not shown) for the mixer is aligned transversely near the first injector and is spaced/offset from the outlet opening. Thus, upon entering the compact SCR mixer 30, the exhaust gas must change direction and is directed about the swirl plate while passing by the impingement plates 34, 38 with flaps and openings and the second injector flange 36, before exiting the compact SCR mixer 30. In another embodiment, the impingement plates have a flat rectangular shape.

In one embodiment, the compact SCR device is formed as a monolithic compact SCR device including a DOC, a compact SCR mixer and an SCR. In another embodiment, the monolithic compact SCR device includes a DPF.

The arrangement provides, among other things, a multi injection system for spraying DEF fluid in diesel exhaust stream rather than utilizing the traditional way of using a single injector only. This approach will lead to better heat transfer between exhaust gas and DEF liquid film, thus resulting in higher film evaporation rates, and reducing the risk of solid deposit formation.

The invention claimed is:

1. A SCR device for injecting diesel exhaust fluid (DEF) comprising:
    a diesel oxidation catalyst (DOC);
    a SCR mixer including:
        a generally cylindrical outer wall defining a chamber,
        at least one inlet opening in a top plate disposed on a top/upstream side of the outer wall to receive an exhaust gas flow,
        an outlet opening in a bottom plate disposed on a bottom/downstream side of the outer wall,
        a swirl plate disposed in the chamber and oriented about a portion of the outlet opening, the swirl plate being oriented in a similar direction as the outer wall,
        a first injector flange oriented for injecting DEF into the chamber, and
        a second injector flange oriented for injecting DEF into the chamber; and
    a selective catalytic converter (SCR),
    wherein the DOC is in series with the SCR mixer and the SCR, and
    wherein the DOC, the SCR mixer, and the SCR form a monolithic compact cylindrical shaped SCR device.

2. The SCR device according to claim 1, wherein the SCR includes a diesel particulate filter (DPF), and wherein the DOC, the DPF, the SCR mixer, and the SCR form the monolithic compact cylindrical shaped SCR device.

3. The SCR device according to claim 1, wherein the SCR mixer includes a shielding plate disposed about the opening of the second injector flange and secured to the second injector flange, to minimize effect of exhaust gas flow on injected DEF.

4. The SCR device of claim 3, wherein the shielding plate has a curved shape forming a path for injected DEF.

5. The SCR device of claim 4, wherein the shielding plate includes a plurality of open bore apertures.

6. The SCR device of claim 1, wherein the at least one inlet opening extends from a portion of the swirl plate to a nearby portion of the outer wall, and wherein the inlet opening and the outlet opening are offset, and exhaust gas flow is directed about the swirl plate.

7. The SCR device of claim 1, including a first impingement plate and a second impingement plate spaced inwardly from the first impingement plate.

8. The SCR device according to claim 7, wherein the second injector flange is radially spaced from and offset from the first injector flange, and wherein the first injector flange is oriented for providing DEF toward the first and the second impingement plates.

9. The SCR device according to claim 1, wherein the SCR mixer is free from impingement plates.

10. The SCR device according to claim 1, wherein the first injector flange is free from a shielding plate.

11. A SCR device for injecting diesel exhaust fluid (DEF) comprising:
    a diesel oxidation catalyst (DOC);
    a SCR mixer including:
        a generally cylindrical outer wall defining a chamber,
        at least one inlet opening in a top plate disposed on a top/upstream side of the outer wall to receive an exhaust gas flow,
        an outlet opening in a bottom plate disposed on a bottom/downstream side of the outer wall,
        a swirl plate disposed in the chamber and oriented about a portion of the outlet opening,
        a first injector flange disposed near the inlet opening and oriented for injecting DEF into the chamber,
        a second injector flange disposed downstream from the first injector flange and oriented for injecting DEF into the chamber, and
        a first impingement plate disposed in the chamber downstream from the first injector flange;
        a second impingement plate spaced inwardly within the chamber from the first impingement plate; and
    a selective catalytic converter (SCR),
    wherein the DOC is in series with the SCR mixer and the SCR.

12. The SCR device according to claim 11, wherein the DOC, the SCR mixer, and the SCR form a monolithic compact SCR device.

13. The SCR device according to claim 11, wherein the SCR mixer includes a shielding plate disposed about the opening of one of the injector flanges, to minimize effect of exhaust gas flow on injected DEF.

14. The SCR device according to claim 11, wherein the at least one inlet opening extends from a portion of the swirl plate to a nearby portion of the outer wall, and wherein the inlet opening and the outlet opening are offset, and exhaust gas flow is directed about the swirl plate.

15. The SCR device according to claim 11, wherein the SCR mixer includes a shielding plate secured to the second injector flange and disposed about the opening of the second injector flange to minimize effect of exhaust gas flow on injected DEF.

16. The SCR device of claim 15, wherein the shielding plate has a curved shape for forming a path to receive injected DEF, and wherein the shielding plate includes a plurality of open bore apertures.

17. A compact SCR mixer including:
- an outer wall defining a chamber,
- at least one inlet opening in a top plate disposed on a top/upstream side of the outer wall to receive an exhaust gas flow,
- an outlet opening in a bottom plate disposed on a bottom/downstream side of the outer wall,
- a swirl plate disposed in the chamber and oriented about a portion of the outlet opening,
- a first injector flange disposed in the outer wall and oriented for injecting DEF into the chamber,
- a second injector flange disposed in the outer wall and oriented for injecting DEF into the chamber downstream from the first injector flange, and
- a shielding plate secured to the second injector flange, the shielding plate projecting into the chamber.

18. The compact SCR mixer of claim 17, wherein the shielding plate has a curved shape and is disposed about the opening of the second injector flange for forming a path for injected DEF, and wherein the shielding plate includes a plurality of open bore apertures.

19. The compact SCR mixer of claim 18, wherein the at least one inlet opening extends from a portion of the swirl plate to a nearby portion of the outer wall, and wherein the inlet opening and the outlet opening are offset, and exhaust gas flow is directed about the swirl plate, and
- wherein the compact SCR mixer includes a first impingement plate and a second impingement plate spaced inwardly from the first impingement plate.

* * * * *